US011892827B2

(12) United States Patent
Adami et al.

(10) Patent No.: US 11,892,827 B2
(45) Date of Patent: Feb. 6, 2024

(54) METHOD FOR MONITORING A CORRUGATED BOARD PRODUCTION PLANT

(71) Applicant: Fosber S.p.A., Pescaglia (IT)

(72) Inventors: Mauro Adami, Viareggio (IT); Marco Imposti, Capannori (IT); Gianluca Berrettini, Gragnano (IT)

(73) Assignee: Fosber S.p.A., Pescaglia (IT)

( * ) Notice: Subject to any disclaimer, the term of this patent is extended or adjusted under 35 U.S.C. 154(b) by 28 days.

(21) Appl. No.: 17/625,428

(22) PCT Filed: Jul. 8, 2020

(86) PCT No.: PCT/EP2020/069287
§ 371 (c)(1),
(2) Date: Jan. 7, 2022

(87) PCT Pub. No.: WO2021/005123
PCT Pub. Date: Jan. 14, 2021

(65) Prior Publication Data
US 2022/0260984 A1    Aug. 18, 2022

(30) Foreign Application Priority Data
Jul. 10, 2019   (IT) .................. 102019000011319

(51) Int. Cl.
G05B 23/02    (2006.01)
B31F 1/28     (2006.01)

(52) U.S. Cl.
CPC .......... G05B 23/024 (2013.01); B31F 1/2831 (2013.01); G05B 23/021 (2013.01)

(58) Field of Classification Search
CPC ................ G05B 23/024; G05B 23/021; G06Q 10/063114
See application file for complete search history.

(56) References Cited

U.S. PATENT DOCUMENTS 5,829,951 A    11/1998   Adami
5,951,454 A    9/1999    Adami
(Continued)

FOREIGN PATENT DOCUMENTS

EP    1362691 B1    8/2006
EP    2119559 A1    11/2009
(Continued)

OTHER PUBLICATIONS

Pelczynki et al., Measurement and Control of Corrugated Board Production Parameters Taking into Account Individual Operator Preferences, Jul. 18, 2023, Sensors 2023, 23, 6478, pp. 1-18 (Year: 2023).*

(Continued)

*Primary Examiner* — Mischita L Henson
(74) *Attorney, Agent, or Firm* — Breiner & Breiner, L.L.C.

(57) ABSTRACT

The methods provide for detecting at least one operational parameter of a functional unit of the plant and calculating a current value of at least a first statistical function of the operational parameter in a current temporal window, the current value of the first statistical function defining a first coordinate of a point of current operation of the functional unit. A step is also provided of verifying whether the point of current operation is within a range of allowable values of the first statistical function, the values contained in the range of allowable values corresponding to a correct operation of the functional unit. In case the point of current operation is outside the range of allowable values, the position is determined of the point of current operation with respect to the range of allowable values and a statistical diagnosis is provided of the cause of the deviation of the current value from the range of allowable values based on the position.

4 Claims, 10 Drawing Sheets

(56) References Cited

U.S. PATENT DOCUMENTS

| | | | |
|---|---|---|---|
| 6,092,452 | A | 7/2000 | Adami |
| 6,165,117 | A | 12/2000 | Adami |
| 6,684,749 | B2 | 2/2004 | Adami |
| 6,722,243 | B2 | 4/2004 | Adami |
| 7,291,243 | B2 | 11/2007 | Adami |
| 8,073,239 | B1 * | 12/2011 | Bahrami ................. G06T 7/001 382/141 |
| 8,342,068 | B2 | 1/2013 | Adami |
| 8,714,223 | B2 | 5/2014 | Adami et al. |
| 11,422,536 | B2 * | 8/2022 | Adami ................. B31F 1/2881 |
| 2012/0193026 | A1 | 8/2012 | Adami |
| 2016/0091398 | A1 * | 3/2016 | Pluemer ................. G01M 7/00 702/183 |

FOREIGN PATENT DOCUMENTS

| | | | | |
|---|---|---|---|---|
| EP | 1710183 | B2 | 12/2011 | |
| WO | 2008045190 | A2 | 4/2008 | |
| WO | 2008045190 | A3 | 4/2008 | |
| WO | WO-2008045190 | A2 * | 4/2008 | ......... G05B 19/4184 |
| WO | 2019048437 | A1 | 3/2019 | |

OTHER PUBLICATIONS

Kasprzyk et al., Intelligent Fault Detection and Diagnosis of a Rotary Cutoff in a Corrugator, Aug. 1, 2015, IEEE, 20th International Conference on Methods and Models in Automation and Robotics (MMAR), pp. 1016-1021 (Year: 2015).*

* cited by examiner

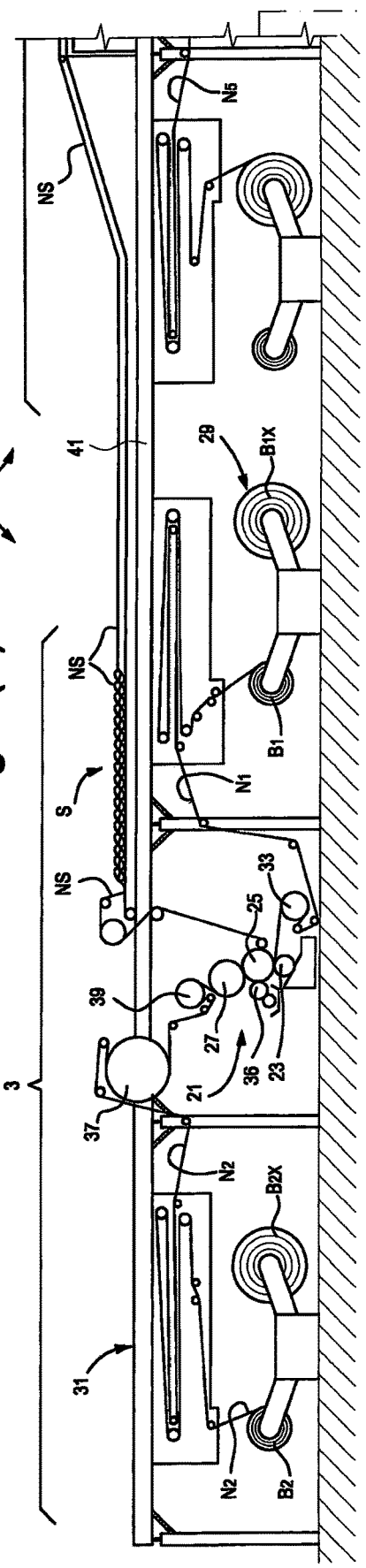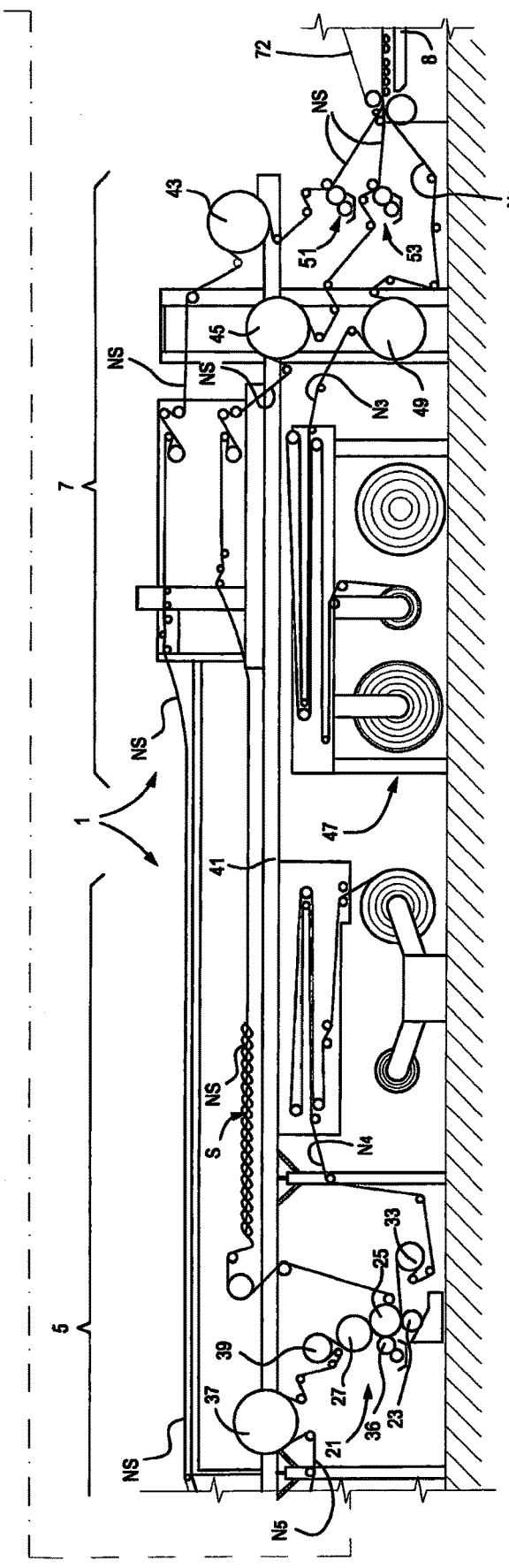

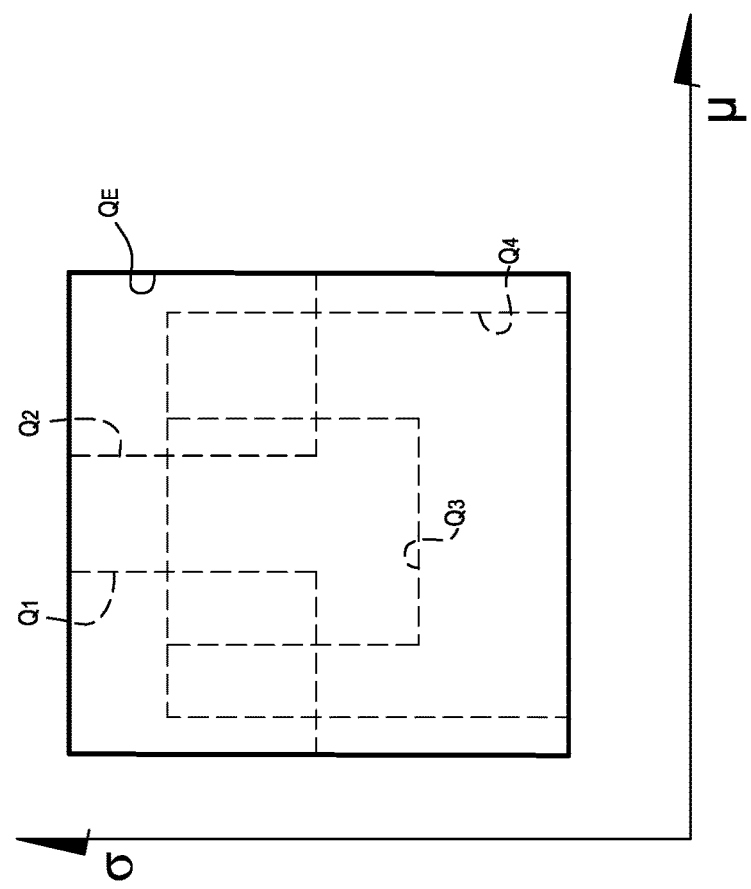
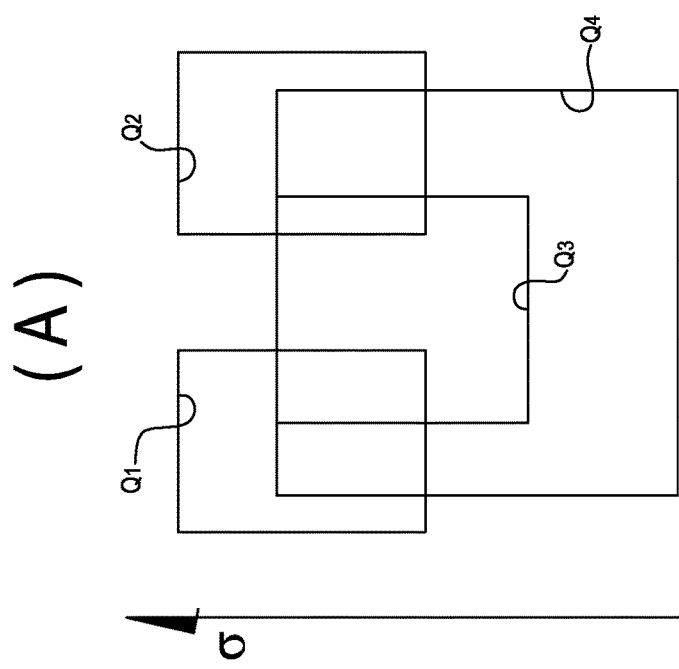
Fig.3

Fig.5
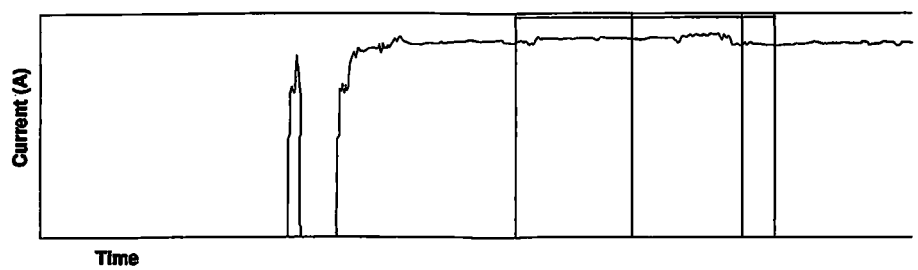
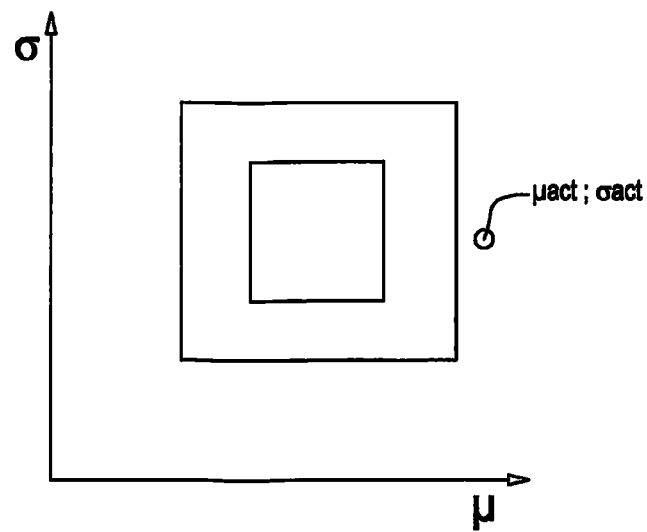
Fig.6

Fig.7
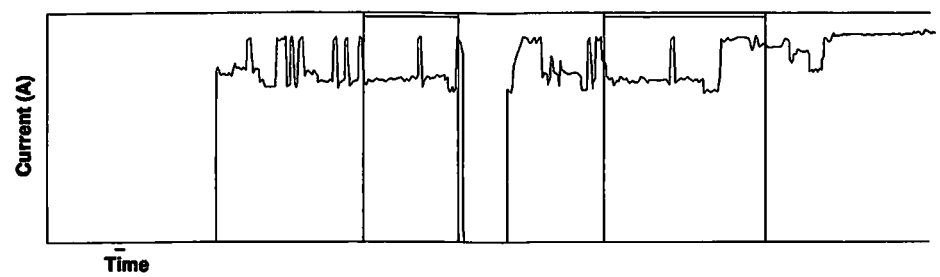
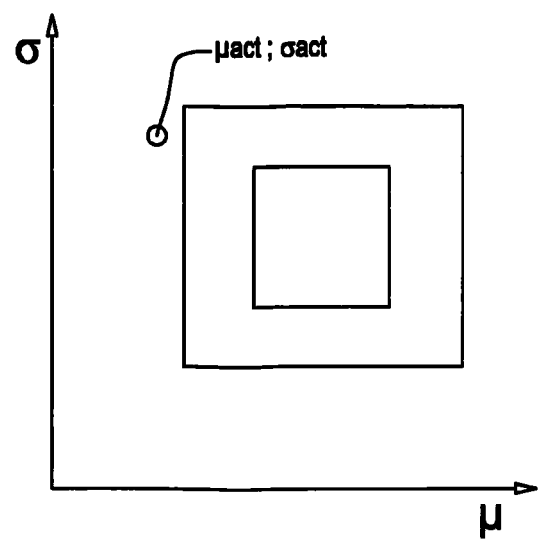
Fig.8

Fig.9
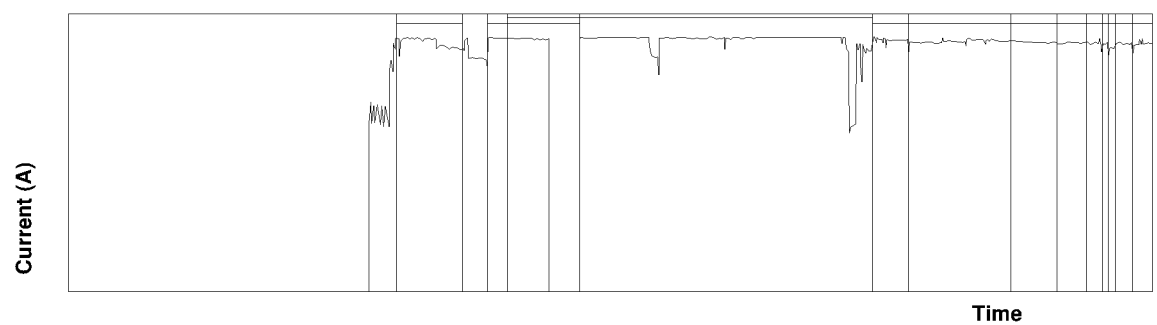
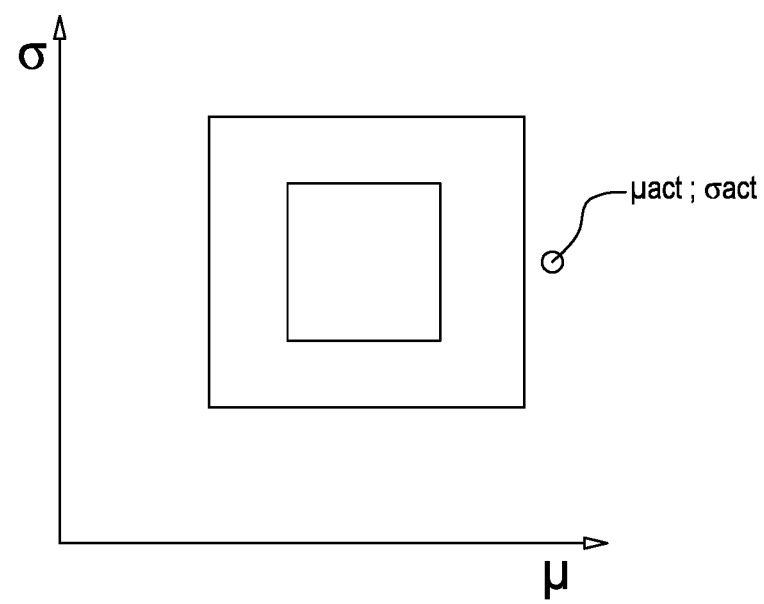
Fig.10

METHOD FOR MONITORING A CORRUGATED BOARD PRODUCTION PLANT

TECHNICAL FIELD

The present invention relates to corrugated board production plants. More in particular, the present invention relates to predictive diagnostics methods for functional components or units of the corrugated board production plants.

BACKGROUND TO THE INVENTION

Corrugated board is manufactured from sheets of flat paper fed by master rolls. Corrugated board usually consists of at least one corrugated paper sheet and two flat paper sheets, so-called liners, between which the corrugated paper sheet is arranged. The liners are glued to the corrugated paper sheet at the tops or crests of the flutes. Generally speaking, a corrugated board may comprise more than one corrugated paper sheet. Usually, a flat paper sheet is arranged between each pair of corrugated paper sheets.

A corrugated board production plant generally comprises one or more unwinders for unwinding rolls of continuous webs or sheets of flat paper, and one or more single facers. Each single facer converts a continuous flat paper sheet into a continuous corrugated paper sheet and joins the continuous corrugated paper sheet to a continuous flat paper sheet, so-called liner. The composite continuous sheet exiting from the single facer is fed to double facer, where a second liner is glued thereto. In general, the plant may comprise one or more single facers to feed one or more sheets, consisting of a continuous corrugated paper sheet and a liner, to the double facer. The plant further comprises a section where the corrugated board from the double facer is processed, this section being called dry-end, in order to distinguish it from the section (so-called wet-end) comprising the machines from the unwinders to the double facer. The dry-end section usually comprises a longitudinal cutting and creasing station, where the corrugated board sheet is cut into continuous longitudinal strips.

The continuous longitudinal strips are further processed in order to produce a series of separate sheets, or a so-called fanfold, i.e. a strip folded in zigzag fashion according to transverse cutting and creasing lines.

The plants of this kind comprise a plurality of functional units of various type. Electric motors, pumps, steam systems, glue feeder, pressurized air systems, etcetera, are for example provided.

The functional units are likely to be affected by wear, and can break. The interventions for maintaining, repairing or replacing the functional units of a line can be very expensive, as there could be the need for stopping the line for even a long time. Downtimes result in production losses affecting the overall production costs. Taking into account that the profit margin for the produced material (corrugated board) are very small, an increase in costs due to production losses resulting from repair or maintenance downtimes could be very onerous for the users. Moreover, stopping the wet-end section results in significant scraps and long restart times, as the corrugated board that is still in the machine shall be completely discharged and rejected and the hot sections (single facers, double facer) shall be brought again to the right temperature before starting the production again.

WO2019048437 discloses a new method for monitoring operation of a corrugated board production plant. The method provides for detecting at least one operational parameter of a functional unit of the plant, for example a current absorbed by a motor. Then, the current value of a statistical function of the operational parameter is calculated in a current temporal window. The maximum value and the minimum value of the same statistical function are calculated based on historicized data of the operational parameter in question. By comparing the current value of the statistical function and the maximum and minimum values, a piece of information of predictive diagnostics is obtained. This innovative method represents a significant support for the plant user and manufacturer, as it allows targeted and timely maintenance interventions.

The continuous search for improvements in plant management suggests looking for even more efficient methods that make predictive diagnostics more effective and maintenance and/or repair interventions more timely and targeted.

SUMMARY

The present invention is based on what nowadays discovered, i.e. that the statistical functions described and used in the method disclosed in WO2019048437 can provide further useful information for predictive diagnostics on corrugated board production plants.

Essentially, a method is provided for monitoring operation of a corrugated board production plant having a plurality of functional units. At least one operational parameter is detected for one or more of the functional units. "Operational parameter" means any measurable parameter related to the operation of the functional unit. For example, an operational parameter of an electric actuator may be the absorbed current, or the driving torque. An operational parameter of a hydraulic or pneumatic component may be a working fluid (a liquid one or a gaseous one, respectively). The method further comprises the step of calculating a current value of at least a first statistical function of the operational parameter in a current temporal window. The current value of the first statistical function defines a first coordinate of a point of current operation of the functional unit. The method also comprises the step of verifying whether the point of current operation is within a range of allowable values of the first statistical function. The values contained in this range of allowable values correspond to correct operation of the functional unit.

In case the point of current operation is outside the range of allowable values, the position of the point of current operation with respect to the range of allowable values is determined. Based on this position, a statistical diagnosis is provided of the cause of the deviation of the current value from the range of allowable values, i.e. of the cause of the anomalous operation of the functional unit.

For example, in the case of an electric motor, the statistical function can be representative of an average value of the absorbed current. Anomalous operation may lead to an excessively high average value of the absorbed current.

The method is based on the surprising finding that the position of the point of current operation, i.e. the coordinates thereof in a one-, two- or multi-dimensional space (the coordinates whereof can be represented by corresponding statistical functions) with respect to a range of allowable current values, is not only indicative of the imminence of a failure, but also provides an indication on the nature of the failure and, thus, on the possible measures to be taken, i.e. the solutions to be adopted, in order that the functional unit operates correctly again, i.e. with the point of current operation within the range of allowable values.

Even if, in principle, it is possible to use only one statistical function, and therefore to use a one-dimensional range of allowable values, it is preferable to use at least two statistical functions, and therefore to detect the position of the point of operation in a two-dimensional space. In this space, the range of allowable values is defined by a surface, for example although not necessarily, rectangular in shape.

More than two statistical functions can be also used.

Further advantageous embodiments and features of the method according to the invention will be described below and in the attached claims, which form an integral part of this description.

BRIEF DESCRIPTION OF THE DRAWING

The invention will be better understood by following the description below and the attached drawing, showing a non-limiting embodiment of the invention. More particularly, in the drawing:

FIGS. 3(A) and 3(B) show a method for defining a range of allowable values as an envelope of a plurality of ranges of allowable values calculated in a plurality of learning cycles or phases;

FIGS. 5 to 10 show diagrams of anomalous operations of the motor of FIG. 4;

DETAILED DESCRIPTION

Figure 1:
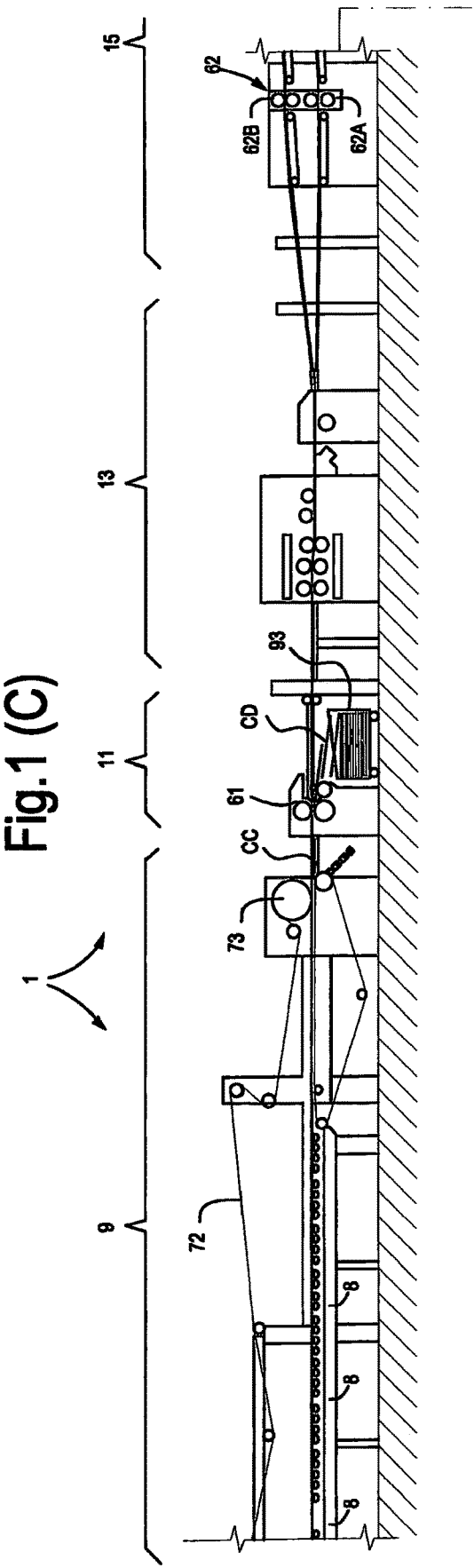
FIGS. 1A, 1B, 1C, and 1D show portions of a corrugated board production plant, these portions being arranged in sequence along the board feeding path.
Figure 1:
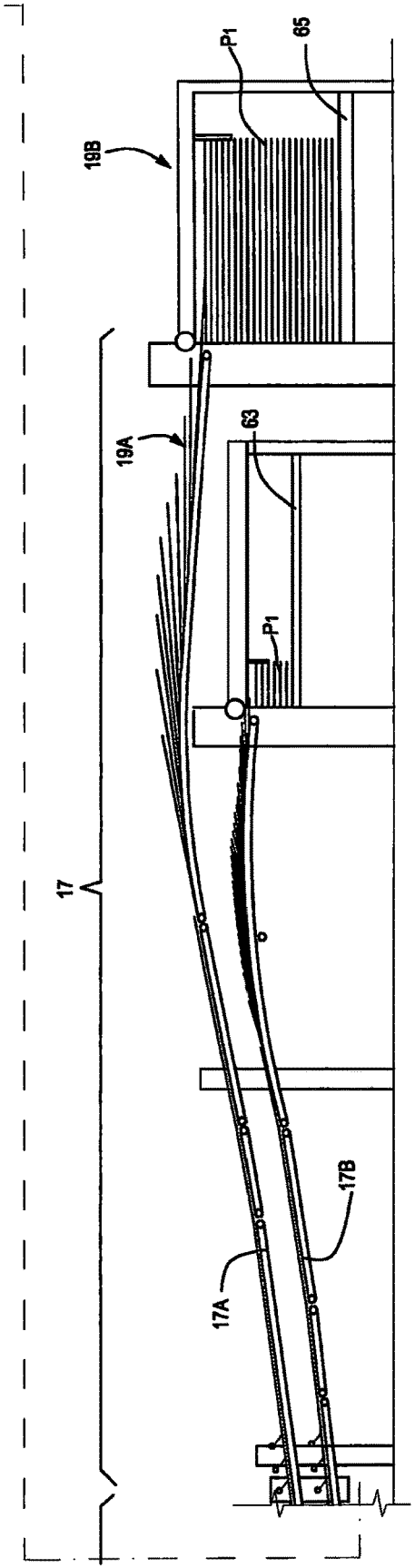

In the illustrated embodiment, a plant is described for the production of double-wall corrugated board sheets, i.e. with two sheets of corrugated paper, so-called fluted paper, interposed between two flat paper sheets, so-called liners, and an intermediate sheet interposed between the two fluted paper sheets. Moreover, the plant is configured to form two stacks of board sheets on two adjacent upstackers.

However, it should be understood that the features described hereunder, related to the predictive diagnostics system and method, may be also used in plants provided with a different number of single facers, and thus adapted to produce a corrugated board sheet comprising a different number of sheets. Also, the stacking systems may be different, for example they can be adapted to form only a single stack or more than two stacks of board sheets. In other embodiments, the stacking systems can provide for means for fan-folding the corrugated board sheet without cutting it into single sheets.

Analogously, the double facer and the longitudinal cutting and creasing station, described hereunder just by way of example, may be configured differently from what described and illustrated herein.

With reference to the attached drawing, the plant comprises a first section 3 for producing a first single-faced corrugated board sheet, a second section 5 for producing a second single-faced corrugated board sheet, a third section 7 for feeding the two single-faced corrugated board sheets together with a flat paper sheet to a double facer 8 of a section 9 comprising the double facer 8 and the corresponding accessories. From section 9 a composite corrugated board sheet exits, formed by the set of the single-faced corrugated board sheets and of the further flat paper sheet glued thereto, this flat paper sheet forming a second liner of the composite corrugated board sheet.

Downstream of section 9 a section 11 is provided, in which devices are arranged for removing trimmings, and downstream of section 11 a section 13 is provided for longitudinally cutting and creasing the corrugated board sheet coming from the section 9 containing the double facer 8, in order to cut the corrugated board sheet into a plurality of corrugated board longitudinal strips and to form creasing lines along the longitudinal extension of the single longitudinal strips of continuous corrugated board.

In the illustrated embodiment, the plant 1 also comprises, just by way of example, a section 15 for transversely cutting the corrugated board strips coming from section 13, a double conveyor 17, and two areas 19A and 19B for stacking the board sheets cut in section 15 and fed by means of the double conveyor 17.

In section 3, a first single facer 21 is arranged. Single facers usable for producing a single-faced corrugated board sheet are known. Only the main elements of the single facer will be described hereunder, the single facer being for example as that disclosed in U.S. Pat. No. 8,714,223 or in EP 1362691, whose content is included in the present description.

Briefly, the single facer 21 may comprise a first corrugating roller 23 co-acting with a second corrugating roller 25 and a pressure roller 27, or other pressure member, to join a flat paper sheet and a corrugated board sheet, as described hereunder. A first flat paper sheet N1 is fed to the single facer 21 from a first unwinder 29. The unwinder 29 may be configured in known fashion, thus it will not be described in detail. The unwinder 29 may comprise two positions for a first unwinding reel B1, from which the first flat paper sheet N1 is supplied, and a second waiting reel B1X, which will be unwound when the reel B1 is finished.

A second flat paper sheet N2 is unwound from a second unwinder 31, which can be substantially equal to the unwinder 29, and onto which a first reel B2, from which the paper sheet N2 is unwound, and a second waiting reel B2X are arranged, the waiting reel B2X starting to be unwound when the reel B1 is finished.

The first flat paper sheet N1 is fed to the corrugating roller 23, after having been passed around a heating roller 33. The arc of contact of the paper sheet N1 around the heating roller 33 can be modified in order to transfer to the flat paper sheet N1 a greater or lower amount of heat coming from inside the heating roller 33, for example heated with steam circulating inside itself.

The first flat paper sheet N1 is corrugated passing through the nip formed between the corrugating rollers 23 and 25. In this way, a corrugated paper sheet N1 is obtained at the exit from the nip between the corrugating rollers 23 and 25. A suitable glue is applied by gluing unit 35 to the crests formed on the corrugated paper sheet, so that the corrugated paper sheet N1 can be glued onto the flat paper sheet N2 fed, together with the corrugated paper sheet N1, through the nip formed between the second corrugating roller 25 and the pressure roller 27.

The gluing unit 35 may comprise an application roller 36, in contact with the crests of the corrugated paper sheet N1 driven around the second corrugating roller 25. The application roller 36 receives the glue from a distributing roller or screen roller 38, which takes glue from a tank 40 or similar. The distance between the rollers 36 and 38 can be regulated to adjust the amount of glue applied to the corrugated paper sheet N1.

In some embodiments, the second flat paper sheet N2 may be fed around one or more rollers 37, 39 arranged between the unwinder 31 and the single facer 21, in order to be heated. The contact arc between the flat paper sheet N2 and any one or both of the rollers 37, 39 can be modified in order to vary the amount of heat transferred by the roller(s) 37, 39 to the flat paper sheet N2 before it comes into contact with the pressure roller 27. Also, the pressure roller 27 can be heated internally to glue the paper sheets N1 and N2 in conditions of high pressure and high temperature.

Figure 2:
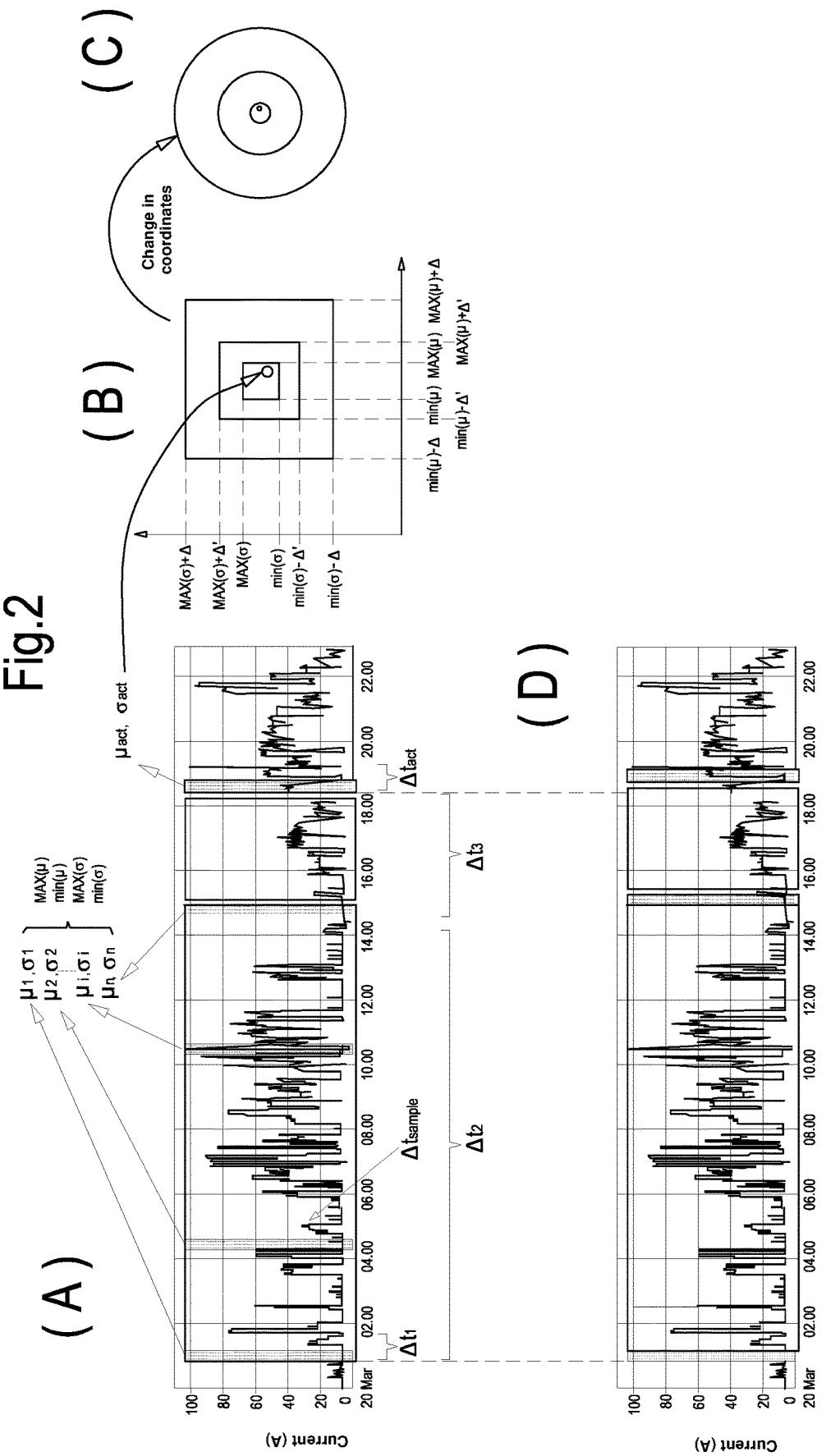
FIGS. 2(A), 2(B), 2(C), and 2(D) show example diagrams illustrating the predictive diagnostics method disclosed herein.

At the output of the single facer 21, a single-faced corrugated board sheet NS is obtained, formed by the first corrugated paper sheet N1 and the second flat paper sheet N2, as shown in the enlargement of FIG. 2. The flutes or crests O formed on the first paper sheet N1 are glued by means of a glue C, applied by the gluing unit 35 to the flutes O onto the surface of the flat paper sheet N2 facing the corrugated paper sheet N1.

Downstream of the single facer 21 a bridge 41 is arranged, which extends towards the section 5 and the following sections 7 and 9 of the plant 1. On the bridge 41, a stock S of single-faced corrugated board sheet NS can be formed, with the formation of suitable accumulation folds, so that the operating speed of the single facer 21 can be made, at least partially, independent of the operating speed of the downstream sections.

The single-faced corrugated board sheet NS is then fed along a first path which develops above the bridge 41 up to a heating roller 43, around which the single-faced corrugated board sheet NS can be guided for an adjustable arc, in order to be appropriately heated before reaching the double facer 8 of section 9.

In the illustrated embodiment, the plant 1 comprises a second section 5 substantially equal to section 3, where a second single-faced corrugated board sheet, still indicated with NS, is formed, by means of a further pair of paper sheets N4, N5 coming from unwinders similar to the unwinders 29 and 31, and a single facer similar to the single facer 21. This second single-faced corrugated board sheet NS is fed to the bridge 41 to form a stock S and to be fed towards the double facer 8 of section 9, being guided around a heating roller 45, substantially equivalent to the heating roller 43.

In other embodiments, the section 5 as well as the respective single facer can be omitted. Vice versa, in further embodiments, more than two sections 3, 5 may be provided, with respective single facer and unwinder of the paper sheets to form respective single-faced corrugated board sheets NS, which are then glued together by means of the double facer 8 of section 9.

A flat paper sheet N3 is unwound from a further unwinder 47 and fed, preferably passing around a heating roller 49, to the double facer section 9. Gluing units 51, 53 apply, in a known manner, a glue to the crests of the respective corrugated paper sheet of the two single-faced corrugated board sheets NS, to glue them together and with the flat paper sheet N3, which will form the second liner of the composite corrugated board CC coming out from section 9, the first liner being formed by the flat paper sheet N2.

The section 9 containing the double facer can be configured in a known manner and will not be described in detail herein. Exemplary embodiments of the single facer are disclosed in U.S. Pat. No. 7,291,243 and in US2012/0193026, the content whereof is incorporated in the present description and which can be referred to for greater details of embodiment of this section of the plant.

In section 11, a transverse rotary shear 61 is arranged, which can perform transverse cuts to sever, completely or partially, the composite corrugated board CC fed from section 9. The transverse rotary shear 61 may be configured for example as described in U.S. Pat. No. 6,722,243, the content whereof is incorporated in the present description. As will be described in greater detail below, the transverse rotary shear 61 can be used, in particular, to remove portions of corrugated board CC where there are gluing defects or other defects.

The composite corrugated board CC, fed through the cutting and creasing section 13, is divided into strips which can be deviated along two paths defined by the two conveyors 17A, 17B of section 17. Section 13 can be configured in a known manner, for example as disclosed in U.S. Pat. Nos. 5,951,454, 6,165,117, 6,092,452, 6,684,749, 8,342,068 or in other prior art documents cited in the above mentioned patent documents, the content whereof is incorporated in the present description.

The two conveyors 17A, 17B convey corrugated board sheets obtained by transversely cutting the continuous strips of composite corrugated board in section 15, in order to form stacks P1, P2 on stacking planes 63, 65, known and configured for example as disclosed in EP 1710183, U.S. Pat. No. 5,829,951, or in other patent documents cited in these patents, the content whereof is incorporated in the present description. Reference number 62 indicates a station for transversely cutting the continuous strips of composite corrugated board coming from the longitudinal cutting and creasing section 13. The station 62 comprises transverse shears 62A, 62B, which cuts each continuous strip coming from the section 13 into single sheets of given length. The line can comprise a transverse shear 62A, 62B for each conveyor 17A, 17B.

Each section or station of the plant 1 briefly described above comprises one or more functional units, each of which can be supplied with electricity, pressurized air, steam, glue or other material or fluid, or combinations thereof. For example, each single facer comprises one or more motors for controlling the rotation of the corrugating rollers and of the pressure roller, steam supply systems for heating the rollers and systems for supply the glue to be applied to the crests of the corrugated paper sheet. Moreover, each section of the line or plant 1 comprises motion transmission members, such as belts, chains, shafts, joints, in addition to thrust or radial bearings. Some stations comprise rotating members that are subject to wear, such as disc-shaped knives, rectilinear or helical blades, creasing tools etc.

The functional units are subject to wear; therefore, they require, over time, to be maintained, repaired or replaced. According to an aspect described herein, in order to avoid or reduce failures that can cause long downtimes and/or in order to better schedule the replacement, maintenance and repair interventions, a method is provided for managing and controlling operational parameters of the plant 1, allowing predictive diagnostics on one or more functional units of the line or plant 1. Below, an embodiment will be generally described of a predictive diagnostics method and specific examples will be then provided (just by way of non-limiting example) of the method applied to a series of functional units of the plant 1.

One or more functional units of the plant 1 can comprise one or more sensors for detecting at least one operational parameter, or a plurality of operational parameters, of the functional unit. The sensors are used for acquiring values of the operational parameters during a learning step. After the initial learning step, the sensors are used for acquiring current values of the operational parameter(s) in order to perform a step of control and predictive diagnostics of the functional unit by using the current values and historicized data related to the values of the same parameters, previously acquired during the learning step. As it will be better explained below, the historicized data are continuously updated, by providing that the learning step is not performed only in an initial time interval; on the contrary, it is performed continuously in a movable temporal window, here below referred to as movable learning temporal window $\Delta t_2$. In this way, the historicized values of data used for predictive diagnostics are continuously updated.

In some embodiments, the initial learning step can be avoided, and, as historicized values, values can be used of the same parameters related to a plant having similar features and already put into operation. Essentially, as historicized data for a second plant (at least in an initial operation step), the values are used of the parameters related to the same functional units of a similar plant previously installed and already gone into operation.

For example, the functional unit can comprise an electric motor and one or more sensors for detecting one or more electrical parameters, for example voltage, current, active or reactive power, and/or one or more parameters related to mechanical quantities such as torque, vibration, etc.

More in general, based on the functional unit, one or more of the following sensors can be provided; current sensors; voltage sensors; temperature sensors; vibration sensors; speed sensors; acceleration sensors; air flow rate sensors; steam flow rate sensors; glue consumption sensors; pressure sensors; sensors or systems for measuring the electricity consumption; torque sensors.

The predictive diagnostics method can provide for a learning step, during which a set of historicized data is created related to an operational parameter characterizing a given functional unit. In the case of an electric motor, the operational parameter can be, for example, the absorbed current. As mentioned above, the learning step can be also represented, alternatively or in combination, by a step of acquiring historicized data from another equal or similar plant or section thereof, that has already gone into operation.

In general, some operational parameters can be acquired through suitable sensors, probes or transducers. For example, voltage and power parameters can be acquired through voltage and current sensors. Torque parameters can be detected through torque sensors or by processing electric signals of an actuating motor. Temperatures can be detected by means of temperature sensors Forces and pressures can be detected by means of sensors or load cells, pressure switches and the like. In some cases, some operational parameters can be given by actuating respective actuators. In some cases, operational parameters can be already available as process parameters, such as pressure, speed, etc.

FIGS. 2(A), 2(B), 2(C) and 2(D) schematically show an embodiment of the method disclosed in WO2019048437, which can be a starting point for the improved method described herein.

More specifically, FIG. 2(A) shows a generic diagram of a generic operational parameter, for example the current absorbed by a motor, as a function of time. The operational parameter is sampled with a sampling interval indicated with $\Delta t_{sample}$ in FIG. 2. On the horizontal axis the time is indicated, while on the vertical axis the operational parameter is indicated. The sampling interval can be, for example, one second.

In some embodiments, the operational parameters can be previously processed. They can be, for example, filtered, interpolated, or processed in other manner.

A movable learning temporal window, indicated with $\Delta t_2$ is identified along the time axis. The movable learning temporal window can last, for example, some days or weeks. Just by way of example, the movable learning temporal window (below also simply "learning temporal window") can last 60 days. The data acquired by means of a control system during the movable learning temporal window $\Delta t_2$ are processed, and the processing result is stored. According to some embodiments, single calculating windows, for calculating a statistical function related to the operational parameter in question, are identified within the movable learning temporal window $\Delta t_2$. In the diagram of FIG. 2, the window for calculating the statistical function is indicated with $\Delta t_1$. The calculating window is substantially a temporal window, whose duration is lower than that of the learning temporal window $\Delta t_2$. In some embodiments, the duration of the calculating window $\Delta t_1$ for calculating the statistical function is some minutes.

The processing of the historicized data acquired within the movable learning temporal window $\Delta t_2$ can provide for calculating a first statistical function and, if necessary, a second statistical function within each statistical function calculating window $\Delta t_1$ for. In some embodiments, the statistical function can be a power spectral density, or a root mean square, or simply a maximum value and a minimum value, calculated on the set of data related to the controlled parameter and acquired within the temporal window in question. In particularly advantageous embodiments, the statistical function can be a variance (indicated with $\sigma$ in FIG. 2) or a mean (indicated with $\mu$ in FIG. 2) of the values of the operational parameter in question. In advantageous embodiments, both the variance and the mean of the data acquired in each single statistical function calculating window $\Delta t_1$ are calculated. It is also possible to calculate more than two statistical functions.

Practically, along the movable learning temporal window $\Delta t_2$ a movable calculating window $\Delta t_1$ can move at regular intervals, for example 1s, within which the statistical function(s) related to the data contained in this window are calculated. In this way, the statistical functions are calculated on all the historicized data acquired within the time defined by the movable learning temporal window $\Delta t_2$.

For each position of the calculating window $\Delta t_1$ it is possible to calculate, for example, the variance and the mean of the values of the operational parameter contained within the calculating window. For example, for a generic $i^{-th}$ position of the calculating window $(\Delta t_1)_i$, a variance $\sigma_i$ and a mean $\mu_i$ can be calculated in this way, (where i=1 . . . N). The maximum and minimum values of the variance and the of mean, indicated as follows in FIG. 2, can be selected among all values calculated for the mean $(\mu_1, \mu_i, \ldots \mu_N)$ and among all values calculated for the variance $(\sigma_1, \sigma_i, \ldots \sigma_N)$ for a given movable learning temporal window $\Delta t_2$:

maximum value of the mean: $MAX(\mu)$,
minimum value of the mean: $min(\mu)$
maximum value of the variance: $MAX(\sigma)$
minimum value of the variance: $min(\sigma)$.

The maximum and minimum values of the two statistical functions are stored by the control unit of the plant 1. As the movable learning temporal window $\Delta t_2$ is a window movable over time, as it will be described below, the four maximum and minimum values of variance and mean vary over time, while the plant is operating.

In some embodiments, it is possible to detect the values MAX(µ), min(µ), MAX(σ) and min(σ) by using a higher number of samples of the operational parameter. To this end, it is possible to do the following.

A suitable sampling interval $\Delta t_{sample}$ is chosen. The sampling interval can be, for example, some seconds. Just by way of non-limiting example, it is possible to set a sampling interval $\Delta t_{sample}=1$ second. At every second it is possible to calculate the value of the two statistical function, variance and mean, on the operational parameter values acquired during the just past calculating window $\Delta t_1$. At the subsequent second, the calculating window $\Delta t_1$ moves by 1 second and the variance and the mean are calculated again on the values of the operational parameter in the calculating window $\Delta t_1$ translated by 1 second. The process can continue, for example, for the whole day. For each day it is possible to detect and store the maximum and minimum values of variance and mean calculated as described above. The maximum and minimum values can be also calculated, instead of over 24-hours, over a different time frame, for example every hour, or every ten hours. The 24-hours frame is chosen just by way of practicality. Practically, in case of a sampling interval of 1 second, over a day 24×60× 60=86400 values of variance and the same number of values of mean are collected. Each value is calculated on a calculating window $\Delta t_1$. Based on the 86400 values collected every day for each of the two statistical functions, the maximum value and the minimum value $\sigma_{MAX}$, $\sigma_{min}$, $\mu_{MAX}$, $\mu_{min}$ are determined. At the end of the learning step, i.e. once the temporal window $\Delta t_2$, has finished, whose generic duration is G days, the system will have G maximum values of variance, G maximum values of mean, G minimum values of variance and G minimum values of mean. If $\Delta t_2=60$ days, 60 maximum and minimum values will be available for each statistical function. Based on each of these four sets of G=60 elements, the values MAX(µ), min(µ) MAX(σ) and min(σ) are detected.

In other embodiments, it is possible directly to identify the maximum and the minimal among all the collected samples.

Once the initial learning step is finished, or once the values related to a similar plant already in operation have been acquired, the values of the operational parameter continue to be acquired in a time interval $\Delta t_3$, the duration whereof is preferably lower than the width, i.e. the duration, of the movable learning temporal window $\Delta t_2$. For example, the time interval $\Delta t_3$ can have a duration of some days, for example from 0 to 20 days, typically 15 days. It should be understood that these numerical data, as well as the previous ones, are given just by way of non-limiting example.

Once the time interval $\Delta t_3$ following the movable learning temporal window $\Delta t_2$ (or the data whereof are added to the data acquired by a data collection done for a similar plant) has finished, the predictive diagnostics process starts for the functional unit, to which the detected and processed operational parameter refers. This step provides for calculating the first statistical function and the second statistical function (variance and mean in the illustrated example) of the values of the operational parameter detected during a current temporal window $\Delta t_{act}$. In some embodiments, the duration of the current temporal window can be the same as the duration of the window $\Delta t_1$ for calculating the statistical function. As it will be better explained below, this is particularly preferred as the data acquired during this step in the current temporal window $\Delta t_{act}$ will be used as historicized data for dynamic leaning. Also, the current temporal window $\Delta t_{act}$ is movable, i.e. it translates over time similarly to the movable learning temporal window $\Delta t_2$. The current temporal window preferably remains at fixed temporal distance (interval $\Delta t_3$) from the movable learning temporal window.

In the diagram of FIG. 2, the values of the statistical function variance and of the statistical function mean for the operational parameter, calculated in the current temporal window $\Delta t_{act}$, are respectively indicated with $\sigma_{act}$ and $\sigma_{act}$. These values will also be indicated as current values of the two statistical functions: mean and variance.

The values $\sigma_{act}$ and $\mu_{act}$ calculated in the current temporal window $\Delta t_{act}$ are compared with the values MAX(µ), min (µ); MAX(σ); min(σ) defined above and calculated in the movable learning temporal window $\Delta t_2$. If the functional unit, to which the operational parameter in question refers, operates correctly, the statistical values $\sigma_{act}$ and $\mu_{act}$ shall be comprised between the maximum and minimum values calculated in the movable learning temporal window. If necessary, it is possible to provide, for each of the two statistical functions, respective tolerance intervals above and below the respective maximum and minimum values. Starting from the values MAX(µ), min(µ); MAX(σ); min(σ), the extended intervals comprising a tolerance margin are defined as follows:

interval of the first statistical function (variance): [min (σ)–Δ; MAX(σ)+Δ]

interval of the second statistical function (mean): [min (µ)–Δ; MAX(µ)+Δ]

In particularly advantageous embodiments, in each interval defined above it is possible to define a respective intermediate interval:

$$[\min(\sigma) - \Delta'; \text{MAX}(\sigma) + \Delta']$$

$$[\min(\mu) - \Delta'; \text{MAX}(\mu) + \Delta']$$

where $\Delta' < \Delta$.

In FIG. 2(B) a Cartesian diagram is shown; on the horizontal axis the mean is indicated, on the vertical axis the variance is indicated.

In the diagram there are shown: a first inner square, defined by the maximum and minimum values of variance and mean; an intermediate square, containing the inner square; and an outer square, containing the inner square and the intermediate square, defined by the above indicated intervals.

In the illustrated example, the same values Δ and Δ' have been used for the intervals of variance and mean, respectively. However, this is not strictly necessary. It should be understood that, for example, different margins can be provided to enlarge the intervals of mean and variance.

Moreover, as noted, whilst in the described example two statistical functions (variance and mean) are used, it should be understood that in other embodiments different statistical functions and/or a different number of statistical functions can be used.

The current values $\sigma_{act}$ and $\mu_{act}$ of variance and mean calculated in each current temporal window $\Delta t_{act}$ substantially define the coordinates of a point in the diagram of FIG. 2(B). This point is also defined as the point of current operation of the functional unit. The functional unit, to which the operational parameter refers, on which the current values $\sigma_{act}$ and $\mu_{act}$ of variance and mean are calculated, operates correctly if this point is within the square defined by MAX(µ), min(µ), MAX(σ) and min(σ).

This square defines a range of allowable values of the first and the second statistical functions. This range is two-dimensional, as two statistical functions have been used.

As already mentioned, the method can also be implemented using a different number of statistical functions, for example three or more statistical functions, or even only one statistical function, although the use of two statistical functions is currently preferred.

In case of three statistical functions, the range of allowable values is defined by a three-dimensional volume. In case of N statistical functions, the volume of allowable values is defined by a N-dimensional space. In case of only one statistical function, the range of allowable values is reduced to a line, i.e. to a one-dimensional space.

Again with reference to the two-dimensional example of FIG. 2, if the point of current operation of coordinates $\sigma_{act}$ and $\mu_{act}$ is in the square defined by:

$$[\min(\sigma) - \Delta'; \text{MAX}(\sigma) + \Delta']$$

$$[\min(\mu) - \Delta'; \text{MAX}(\mu) + \Delta']$$

no alarm or pre-alarm signal will be provided, as Δ' can be considered as tolerance value around a punctual datum. If the point is between the intermediate square and the outer square defined by $$[\min(\mu) - \Delta; \text{MAX}(\mu) + \Delta]$$

$$[\min(\sigma) - \Delta; \text{MAX}(\sigma) + \Delta]$$

a pre-alarm signal is generated, and if the point is outside the largest square an alarm signal is generated. In other embodiments, a pre-alarm is generated if the point of current operation is between the inner square and the intermediate square, and an alarm signal is generated if the point is between the intermediate square and the outer square, or outside this latter.

These anomalous situations of difference of the statistical functions from the square calculated during the learning step (or acquired from historicized data stored during the operation of an analogous plant or an analogous functional unit of another plant) are indicative of an incipient failure and therefore the respective alarm represents a useful piece of information of predictive diagnostics.

Anomalous data are useful to highlight the beginning of a failure condition, but they shall not be used in the data acquiring step, i.e. in the system learning step, as this could cause errors. Therefore, it is possible to provide for automatic removal (for example through an algorithm) or manual removal (for example by an operator) of anomalous data from the series of data useful for the learning step.

In some embodiments, only one alarm threshold can be used, instead of two alarm thresholds (or pre-alarm and alarm) as described above.

In some embodiments a time threshold can be provided to avoid false alarms, for example due to temporary fluctuations of the operational parameter resulting from factors non linked to an incipient failure condition. The alarm or pre-alarm is only generated if the point defined in the diagram of FIG. 2(B) by the values $\sigma_{act}$ and $\mu_{act}$ remains outside the square defined between the values MAX(µ), min(µ), MAX (σ) and min(σ) and the tolerance intervals, if any, for a time longer than a pre-set time threshold. On the contrary, i.e. in case the anomaly ends after a time shorter than the pre-set temporal threshold, no alarm is generated.

The anomalous operations that can cause such alterations in the used statistical functions (for example the values of variance and mean) to trigger a pre-alarm or an alarm signal, can be due to different external causes, for example a wrong adjustment or a wrong use of the functional unit, an incipient failure of a degradation due to wear, or any other cause.

The square represented in FIG. 2(B) can be used on a monitor to give an immediate visual indication that can be promptly understood by the operator. To give an even more intuitive representation, it is possible to change the coordinates to represent the same situation of FIG. 2(B) in a circular diagram as indicated in FIG. 2(C).

The method for controlling the functional unit, to which the detected operational parameter refers, can provide for calculating the current values $\sigma_{act}$ and $\mu_{act}$ in the current temporal window $\Delta t_{act}$ with a sampling interval $\Delta t_{sample}$ of 1 second, for instance. Every second the current temporal window is moved and the coordinates $\sigma_{act}$ and $\mu_{act}$ of the actual operation point in the plane σ, µ(FIG. 2(B) or FIG. 2(C)) is calculated again.

As indicated above, the current values $\sigma_{act}$ and $\mu_{act}$ of the statistical functions σ and µ calculated in the current temporal window $\Delta t_{act}$ are compared with the MAX(σ), min(σ), MAX(µ) and min(µ) identified in the movable learning temporal window $\Delta t_2$, which is temporally distanced by the interval $\Delta t_3$ from the current temporal window $\Delta t_{act}$. In this way, it is possible to create discontinuity between the learning period and the current period. This can be useful to take into account the fact that some operational parameters of given functional units can be subject to a slow drift over time, for example due to aging of one or more components. Such a drift cannot be detected if the values $\sigma_{act}$ and $\mu_{act}$ are compared with the maximum and minimum values of the statistical functions calculated on a learning temporal window $\Delta t_2$ temporally contiguous to the current temporal window $\Delta t_{act}$. Vice versa, by introducing the time interval $\Delta t_3$, the gradual drift of the detected operational parameter results in a signal or an alarm, as one or the other or both the current values $\sigma_{act}$ and $\mu_{act}$ will be out of the square identified by the maximum and minimum values of the statistical functions calculated on the movable learning temporal window, due to the drift occurred in the time interval $\Delta t_3$.

As mentioned above, the learning step is continuous and dynamic; this means that, once the first learning step in the learning temporal window $\Delta t_2$ has ended, the data related to the controlled operational parameter continue to be stored and the learning temporal window $\Delta t_2$ will move along the time axis (horizontal axis in FIG. 2(A)), so as constantly to be at the same temporal distance $\Delta t_3$ with respect to the current temporal window $\Delta t_{act}$.

The comparison between FIGS. 2(A) and 2(D) makes this aspect clearly apparent. At every temporal step, corresponding, for example, to the time width of the calculating window $\Delta t_1$, the movable learning temporal window $\Delta t_2$ moves by a step equal to the width of the calculating window $\Delta t_{sample}$, pursuing the current temporal window $\Delta t_{act}$. The values of the statistical functions calculated on the oldest calculating window $\Delta t_1$ are discharged and rejected, while the values of the statistical functions calculated on the data contained within the subsequent calculating window $\Delta t_1$ enter the movable learning temporal window $\Delta t_2$. Essentially, as it is clearly apparent by comparing FIGS. 2(A) and 2(D), the movable learning temporal window $\Delta t_2$ is movable over time and moves forward remaining at a temporal distance $\Delta t_3$ from the current temporal window $\Delta t_{act}$. At each forward step, the oldest statistical data are historicized and the more recent statistical data are calculated.

Every time the movable learning temporal window $\Delta t_2$ moves forward by a step $\Delta t_1$ the set of the values ($\mu_1, \ldots \mu_i, \ldots \mu_N$) and ($\sigma_1, \ldots \sigma_i, \ldots \sigma_N$), on which the values MAX($\mu$), min($\mu$), MAX($\sigma$), min($\sigma$) are detected, changes and therefore the maximum and minimal values of the calculated statistical functions can change. The squares represented in FIGS. 2(B) and 2(C) can gradually move over the time. The learning is therefore dynamic and continuous.

The movable learning temporal window $\Delta t_2$ always remains temporally spaced by a time interval $\Delta t_3$ with respect to the current temporal window $\Delta t_{act}$. Therefore, as time passes, even if there is an update of the maximum and minimum values of the statistical functions and therefore a possible movement of the square within which (FIGS. 2(B) and 2(C)) the point defined by the values $\sigma_{act}$, $\mu_{act}$ shall be, there is always the possibility to detect any slow drift of the operational parameter. The duration of the time interval $\Delta t_3$ can be constant. This simplifies the processing process. However, this is not strictly necessary.

Even if reference has been made above to a situation where two statistical functions (mean and variance) are used to define a two-dimensional diagram, where a square or a circular area is detected, within which the point defined by the values $\sigma_{act}$, $\mu_{act}$ shall be, it is also possible to use only one statistical function, for example only variance or only mean. In this case, all the considerations made above apply, with the only difference that the statistical function will be only one and the diagram will be one-dimensional and not two-dimensional.

In other embodiments, it is also possible to use more than two statistical functions, with the same criterion described above. In this case, from a graphical viewpoint, the point of current operation of the functional unit, or more exactly the value of the operational parameter related to this functional unit, shall remain within a cubic (or spherical) volume defined by the maximum and minimum values determined on the movable learning temporal window of the three statistical functions.

Even if in the present description specific reference is made to variance and to a generic mean of the values of the operational parameter in question, it should be however understood that other statistical functions can also be used. Moreover, the mean can be an arithmetic mean, a weighted mean, a geometrical mean, a harmonic mean, a power mean, an arithmetic-geometrical mean, an integral mean, a temporal mean, or any other function defining a mean of values.

What described above is an embodiment of the predictive diagnostics method disclosed in greater detail in WO2019048437, whose content is fully incorporated in the present document.

Even if reference has been made above to a single learning interval, a plurality of learning intervals may also be used, which result in non-coinciding ranges of allowable values, for example in partially overlapping ranges. In this case, a range of allowable values can be defined as the envelope of the ranges of allowable values acquired in the different learning phases or cycles. FIG. 3(A) shows four rectangles Q1, Q2, Q3, and Q4, defined by the maximum and minimum values of mean and variance calculated on four distinct learning intervals. Each of them represents a respective range of allowable values related to a learning phase. FIG. 3(B) shows an envelope rectangle containing all the rectangles Q1, Q2, Q3, Q4 and representing the range of allowable values used in the control method described above.

As mentioned above, the present invention is based on having surprisingly discovered that the displacement of the point of current operation of coordinates ($\sigma_{act}, \mu_{act}$) and the deviation thereof outside the range of allowable values defined by MAX($\mu$), min($\mu$), MAX($\sigma$) and min($\sigma$) is not only indicative of an incipient failure, and this allows a predictive diagnostics of the failure. The position taken by the point of current operation with respect to the range of allowable values, outside this latter, is not random, but is correlated to the type of failure or malfunction that is happening or is about to happen. In other words, the fact that the point of current operation is on the right, rather than on the left, of the range of allowable values is not by chance; indeed, the displacement in one or the other direction outside the range of allowable values is indicative of one type of failure rather than another.

Therefore, the method disclosed herein provides for the step of detecting the position of the point of current operation outside the range of allowable values, and of using this position to obtain statistical information on the type or nature of the malfunction or of the incipient failure as well as to suggest a possible solution, or a possible restoring intervention.

This concept will be more apparent following the example below.

Figure 4:
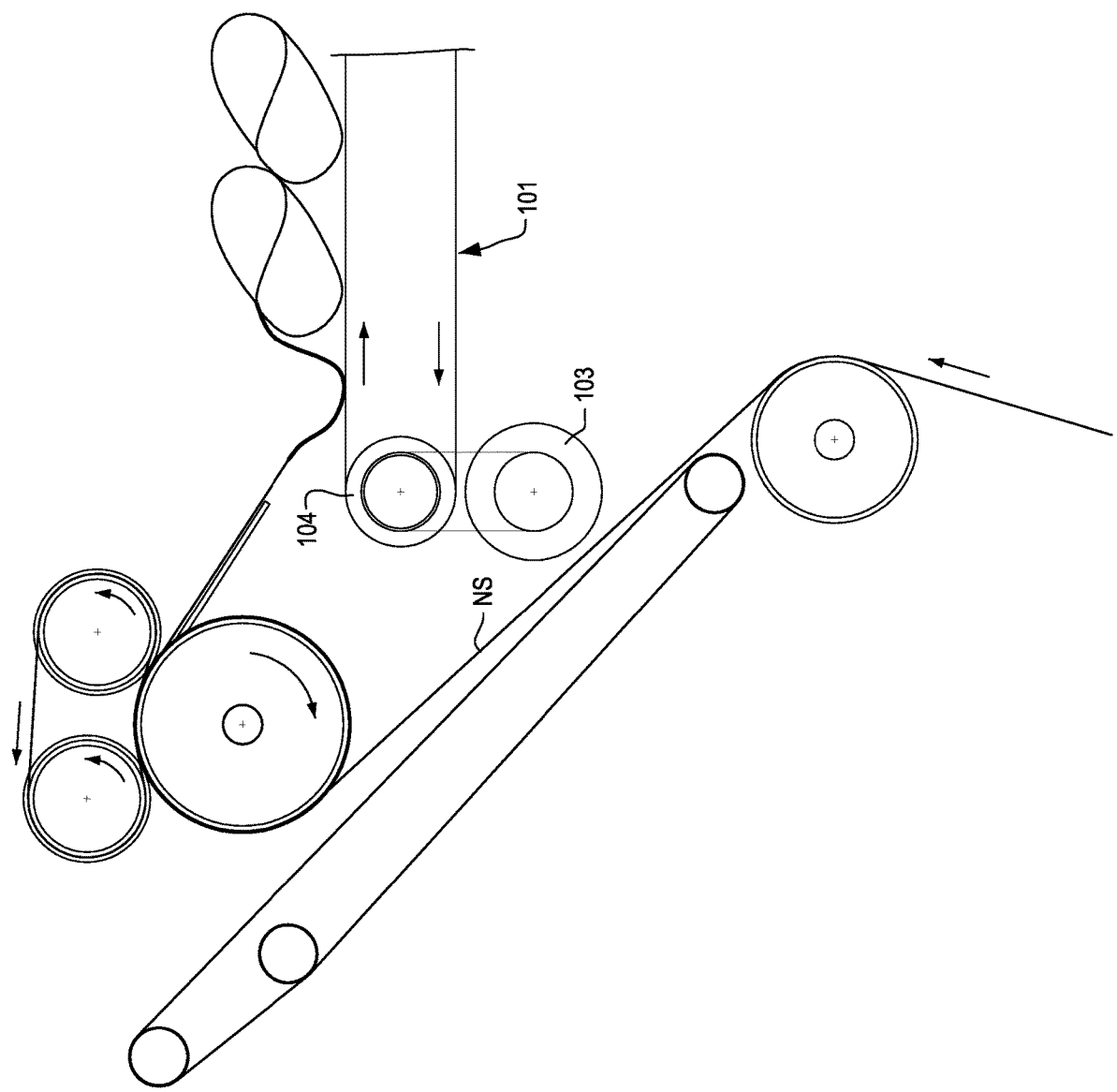
FIG. 4 shows an enlargement of a feeding area of the single-faced corrugated cardboard on the bridge, with the related motor for actuating the corrugated board feeding belts.

FIG. 4 shows in greater detail a portion of the line of FIG. 1. More specifically, FIG. 4 shows the area where a single-faced corrugated board sheet NS is drawn by the single facer on the bridge 41. Reference number 101 indicates a system of belts driven by a motor 103. The belts 101 shall be periodically adjusted and/or replaced due to wear. A possible malfunction of the functional unit represented by the motor 103 can be an excessive or insufficient tension of the belts, or an overheating of the same motor. The operational parameter under control may be the current absorbed by the motor.

FIG. 5 shows a time diagram of the trend of the current absorbed by the motor 103. The time is shown on the y-axis, and the absorbed current is shown on the x-axis. In the diagram of FIG. 5 the belts are too much tensioned and the current absorbed by the motor 103 is therefore above the mean, but substantially constant. Thus, the variance of the operational parameter is between the maximum and minimum values calculated during the learning step, or on the basis of historical data, whilst the mean is greater than the maximum value defining the range of allowable values. The point of current operation, defined by the coordinates constituted by the current value of the variance and the current value of the mean ($\sigma_{act}$ e $\mu_{act}$) is therefore on the right of the range of allowable values.

This situation is shown in FIG. 6, showing the range of allowable values of variance and mean based on a criterion similar to that used for FIG. 2. The point of current operation is outside the range of allowable values, on the right thereof (the mean is greater than the maximum allowable value).

FIG. 7 shows a diagram similar to that of FIG. 5, where the absorbed current (on the x-axis) as a function of time (on the y-axis) is lower than the normal value and fluctuates over the time. This situation occurs, for example, when the belts 101 are not tensioned enough. The absorbed current is lower than the normal value and, when the belts slide on the drive pulley driven by the motor 103, it suddenly decreases.

As a consequence of this anomaly, the average value of the detected operational parameter (absorbed current) of the monitored functional unit (motor 103 of the belts 101) is lower than the minimum allowable value. The variance is greater than the maximum allowable value, due to the fluctuations caused by the loose belts sliding on the drive pulley 104.

The point of current operation is therefore outside the range of allowable values, on the left and above it, as shows in FIG. 8.

By comparing FIGS. 6 and 8 it is thus possible to note that different malfunctions, i.e. anomalies, affecting the same operational parameter (absorbed current) of the same functional unit (motor 103) result in different situations in the diagram of the statistical functions.

By collecting a sufficient number of anomalous events occurred in one or more plants, it is possible not only to detect an anomaly that could result in a failure and that requires intervention, but also to correlate this anomaly to the position of the point of current operation in the diagram of the statistical functions. Conversely, it is also possible to provide information on the type of event (malfunction, failure or incipient failure), which caused alarm signal generated by the fact that the point of current operation is outside the range of allowable values of the statistical functions and thus to suggest a solution or intervention for removing the anomaly and to restore the plant.

In some situations, the gradual and constant increase in current absorbed by the motor 103 may be due to a cause other than the excessive tension of the belts. For example, a malfunction of the cooling fan of the motor 103 may cause an increase of the absorbed current. This situation is shown in FIG. 9. FIG. 10 shows the diagram of the statistical functions with the position of the point of current operation outside the range of allowable values, on the right thereof, due to the increase in the mean value of the absorbed current.

The situation of FIGS. 5, 6 and that of FIGS. 9 and 10 are therefore different as regards the failure or malfunction that caused the alarm signal, but they are equal or approximately equal as regards the anomalous position of the point of current operation with respect to the range of allowable values.

The situation of FIGS. 9 and 10 is statistically much less likely than the situation of FIGS. 5 and 6.

As it is known from a learning phase that the causes of the anomalous operation can be two, that by removing these causes it is possible to restore the plant, and that the first cause is statistically much more frequent than the second cause, when one of the alarm situations shown in FIGS. 5, 6 or in FIGS. 9, 10 occurs, it is possible to have (from the data collected during the learning phase) a list of possible solutions for the anomaly in question. These solutions can be listed proportionally to the probability thereof of being the right solution. In the specific case, the solution consisting in loosening the belts is classified as statistically more successful; therefore, it is listed before the other solution (replacement of the cooling fan or correct assembly thereof).

Based on data collected during a learning phase and, in general, during the use of one or more identical or similar plants, it is possible to create a database where each anomalous situation (point of current operation outside the range of allowable values) is linked to the corresponding cause or to a plurality of possible causes, with the respective solutions. In the example of FIGS. 5, 6, the cause is the excessive tension of the belts; in the example of FIGS. 7 and 8 the cause is the insufficient tension of the belts; and in the example of FIGS. 9 and 10 the (less frequent) cause is a malfunction of the cooling fan. As in the first and third cases the anomaly causes the same positioning of the point of current operation with respect to the range, in both cases the same causes (and solutions) will be indicated.

Once the database has been created, correlating the values of the current statistical functions to the malfunctions, it is possible to use this database to obtain one or more (at least statistical, even if not punctual) pieces of information on what is happening in a functional unit whose parameter of current operation is outside the range of allowable values, and thus on the type of intervention needed for solving the problem.

Figure 11:
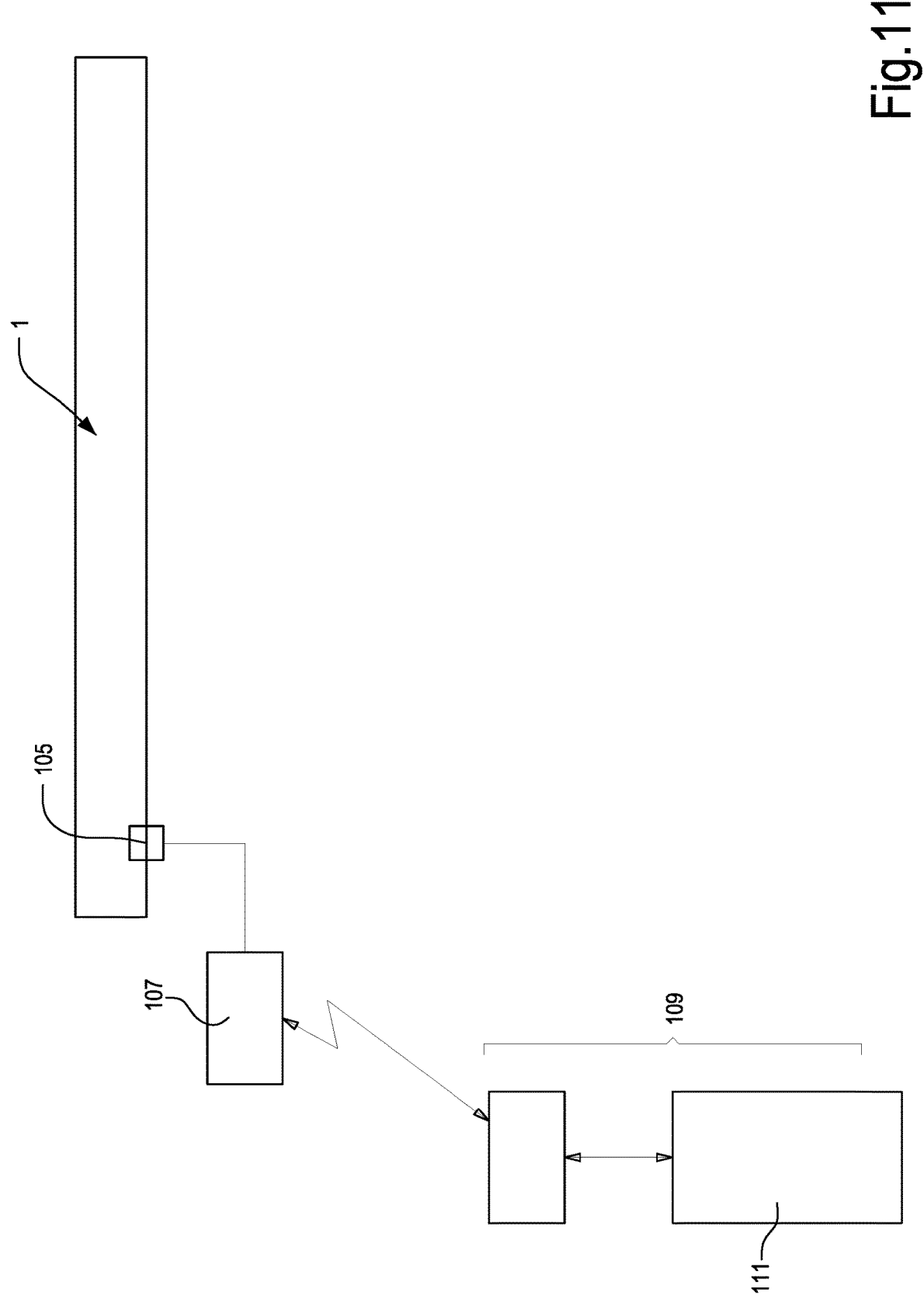
FIG. 11 shows a diagram of the system for accessing the database containing information on the causes of anomalous operations of functional units of the plant.

FIG. 11 shows a block diagram where reference number 1 indicates the corrugated board production plant, number 105 indicates a generic functional unit, for example the motor 103 mentioned above, and number 107 a central control unit. This latter receives, from the sensor(s) of the functional unit 105, data relating to the operation of the functional unit and can determine any anomalous situation, for example values of one or both the statistical functions that are outside the range of allowable values. The central control unit 107 communicates with a server 109. The server 109 accesses a database 111 containing information on the causes of malfunction associated with the various positions of the point of current operation with respect to a range of allowable values for each of the monitored functional units of the plant 1.

When queried by the control unit 107, the server 109 provides the list of the possible causes of the detected anomaly, as well as a solution, or more exactly a list of solutions for plant recovery. In practice, the anomaly can be generally detected by the trend of the signal that moves towards a non-optimal operating area. The anomaly can have several causes. A cause of anomaly can be solved through one or more solutions. The method may also provide for a step of suggesting a plurality of solutions, listed in decreasing order based on the likelihood of success.

In the example illustrated above of the belts 101 and the motor 103, in the case of FIGS. 5, 6 and 9, 10 the server 109 provides two possible causes of malfunction and two corresponding solutions: too much tensioned belts (solution: to loosen the belts); motor cooling fan not working properly (solution: to check fan operation). The first cause is statistically more frequent. The server may provide the control unit 107 with the causes ordered according to the statistical frequency thereof, so as to allow the operator to intervene in a rational way, making checks and interventions starting from the statistically most probable cause.

The described system may also allow to communicate to the server 109 the occurrence of a cause different from those listed on the basis of the content of the database 111. For example, the operator can verify that no one of the listed failure causes has occurred, and can communicate to the server that the anomalous coordinates of the point of current operation correspond, in this specific case, to a cause different from those already present in the database. This new cause (and the corresponding solution) may be stored in the database. In this way it is possible to add contents to the database 111 for future uses.

Furthermore, the operator, who checks which of the causes assumed on the basis of data contained in the database 111 is the actually detected cause, can communicate this piece of information to the server 109, so as to modify the "ranking" of that cause of failure. This can affect the actual content of the database, i.e. the frequency of occurrence of a failure cause (and related solution) with respect to another may vary over time, so as to take into account the actual number of occurrences of this cause.

The above operations may be fully or partially automated, or performed manually, with the intervention of an operator plant-side and/or an operator server-side. The connection between plant 1 and server 109 can be a remote connection via the Internet. In some embodiments, the system may be implemented through cloud technology. The server 109 and the database 111 may be also installed directly in the same place where the plant is located. However, it is preferable to centralize the server and the database, for example at the plant supplier or vendor, or at any other subject in charge of supervision and service, in order to centralize also the information received from the single plants, which can be added to the existing contents of the database.

Figure 12:
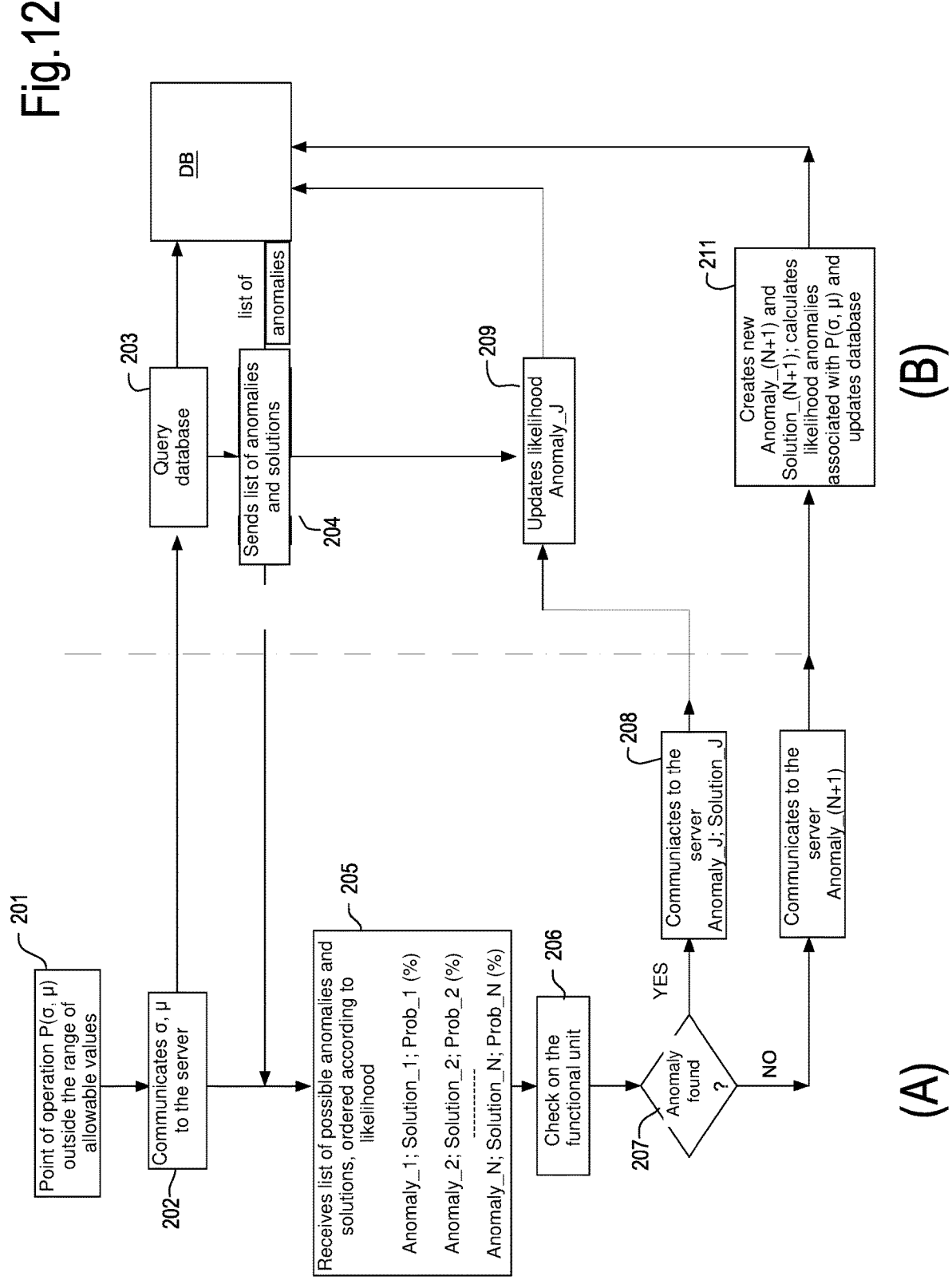
FIG. 12 shows a summary block diagram.

FIG. 12 shows a summary diagram of an embodiment of the method described herein. The left part of the diagram, indicated with (A), shows the functions performed on the plant, for example through a control unit. The right part, indicated with (B), shows the functions performed by a server. The unit controlling the plant, or part thereof, may be connected to the server via the Internet, or through any other suitable channel.

Block 201 shows the detection of an anomaly, represented by the fact that the point P of current operation of coordinates ($\sigma$, $\mu$), representing the operational parameter of a functional unit, is outside the range of allowable values. The anomaly is reported to the server (block 202).

Based on the values of the coordinates ($\sigma$, $\mu$), that is, on the basis of the position of the point of current operation with respect to the range of allowable values, the server queries the database (block 203) and receives (block 204) a list of possible anomalies, and related solutions, which may correspond to the detected coordinates. Each anomaly (Anomaly_i) and the solution thereof (Solution_i) may be characterized by a probability value (Prob_i (%)), i.e. the likelihood of occurrence. The list of possible anomalies and solutions, containing, in the illustrated example, N anomalies and N solutions, is sent to the plant control unit, this latter receives it (block 205) and may for example display it on a user interface, to allow the operator to perform the necessary checks.

The plant operator may carry out the checks (block 206) starting from the anomaly that, more frequently, is associated with the detected anomalous operating conditions (P($\sigma$, $\mu$)).

Through the control unit 107 it is possible to communicate to the server 109 whether the anomaly has been found among those of the list (block 207). If yes, the server 109 is informed (block 208) which of the anomalies (and solutions) listed is the one actually found. The block diagram of FIG. 12 shows that the actually detected anomaly is the $j^{th}$ anomaly (Anomaly_j) and that it has been solved according to the $j^{th}$ solution (Solution_j). In this way the server 109 can update (block 209) the value of the anomaly likelihood, based on the historical data plus the data relating to the just solved anomaly.

If none of the listed anomalies occurred to the functional unit, and the operator identifies a different not listed cause of malfunction, he/she prepares and applies the corresponding solution, if necessary with the aid of a maintenance technician supplied by the plant manufacturing company. The new anomaly, indicated with Anomaly_N+1 in block 210, is communicated to server 109, which inserts it among the possible ones associated with the condition P($\sigma$, $\mu$) and updates the database, see block 211. In doing so, not only a possible $(N+1)^{th}$ anomaly is added among those that can correspond to the operation coordinates P($\sigma$, $\mu$), but also the likelihood of the possible anomalies associated with that given position of the point of operation, outside the range of allowable values, is calculated again.

It should be understood that, in general, it is not possible to identify an anomaly (or a series of anomalies) for each specific point of current operation outside the range of allowable values for $\sigma$ and $\mu$. On the contrary, there will be smaller or larger areas containing points corresponding to a same class of causes, and corresponding solutions that the server 109 may identify and propose to the plant operator.

The data exchanges described with reference to FIG. 12 can take place with a higher or lower degree of automation. In principle, all communications could take place through one or more human operators. In practice, the communications can take place at least partially automatically or semi-automatically, wherein an operator opens a transmission channel between the control unit (or a computer or a server, to which the control unit is associated) and the server 109; data and information can be exchanged through this channel.

In an initial learning phase, the solutions for the various failures or anomalous operations conditions can be obtained from maintenance cards carried out over time, with a gradual and continuous increase of the database 111. In this way, a continuous learning allows to provide increasingly precise solutions to anomalies that can occur in the various functional units of the plant 1.

In the diagram of FIGS. 11 and 12, a solution has been illustrated wherein the plant is physically and managerially separate and independent from the server managing the database that provides information on the causes and solutions for the detected anomalies. However, this architecture is not the only one possible. In fact, the database may resides, for example, in a computer or server belonging to the plant, or in general owned by the plant owner, rather than in a server of a third party. In this case, the operations described above with reference to FIG. 12 can be performed directly from the control unit of the plant 1 or from a server connected to plant 1 and managed by the same subject who manages the plant. In this case the database can be updated with the data of the single plant, but, if necessary, also with data coming from other plants. Several plants can exchange data with one another to be stored in databases located at the single plants, for example in the servers of the companies owning the plants.

For example, in a configuration of this type, each plant may contribute to updating and increasing the database with anomalies/solutions, so as to create a sort of global network of machines.

The invention claimed is:

1. A method for monitoring operation of a corrugated board production plant, the production plant comprising (1) a plurality of functional units requiring predictive diagnostics for maintaining, repairing or replacing of the plurality of functional units, (2) one or more sensors structured to detect and acquire values of at least one operational parameter of said plurality of functional units, and (3) a central control unit structured to receive data from said one or more sensors relating to said at least one operational parameter and determining from said data and from learned and/or historicized data, any anomalous situation; the method comprising steps as follows:

detecting by said one or more sensors said at least one operational parameter of at least one functional unit of the plurality of functional units forming a part of the production plant, said at least one operational parameter relating to operation of the at least one functional unit and being indicative of functioning of the at least one functional unit, and calculating by said central control unit a current value of at least a first statistical function of said operational parameter in a current temporal window, the current value of said first statistical function defining a first coordinate of a point of current operation of the functional unit;

verifying by said central control unit whether the point of current operation is within a range of allowable values of the first statistical function, values contained in said range of allowable values corresponding to a correct operation of the at least one functional unit;

if the point of current operation is outside the range of allowable values, determining by said central control unit a position of the point of current operation with respect to the range of allowable values and providing a statistical diagnosis of cause of deviation by querying a database based on coordinates of the point of current operation;

wherein for at least some of the coordinates of the point of current operation that are outside the range of allowable values, the database contains a plurality of possible causes of the deviation of the point of current operation with respect to the range of allowable values, and, for each of said plurality of possible causes providing an indication on higher or lower probability of occurrence of one of said plurality of possible causes with respect to others of said plurality of possible causes, and based on said indication of higher or lower probability of occurrence of one of said plurality of possible causes, an indication is provided whether the at least one functional unit of said plurality of functional units of said corrugated board production plant requires maintenance, repair, or replacement intervention.

2. The method of claim 1, further comprising calculating a current value of a second statistical function of said operational parameter in said current: temporal window, the current value of the first statistical function and the current value of the second statistical function respectively defining the first coordinate and a second coordinate of the point of current operation of the functional unit; and wherein said range of allowable values is defined as a two-dimensional range of allowable values of the first statistical function and of the second statistical function.

3. The method of claim 1, wherein the database contains for said coordinates of the point of current operation that are outside the range of allowable values, an indication of at least one possible solution for the cause of the deviation of the point of current operation of the functional unit with respect to the range of allowable values.

4. The method of claim 1, further comprising:

based on the position of the point of current operation with respect to the range of allowable values, querying the database through a server and receiving a list of possible anomalies and related solutions, which correspond to the position of the point of current operation; wherein each anomaly of the list of possible anomalies and a related solution thereof are characterized by a probability value indicating likelihood of occurrence of said anomaly;

communicating to the server through said central control unit which anomaly of the list of possible anomalies caused the deviation and, through the server, updating a value of likelihood of the anomaly, based on historical data plus data relating to the just solved anomaly;

if a different anomaly not contained in the list of possible anomalies caused the deviation, said central control unit communicating to the server the different anomaly and adding the different anomaly in the database among the list of possible anomalies associated with the corresponding coordinates of the point of current operation, and calculating again the likelihood of the possible anomalies associated with said coordinates.

* * * * *